(12) United States Patent
Noweck et al.

(10) Patent No.: US 6,773,690 B1
(45) Date of Patent: Aug. 10, 2004

(54) BOEHMITIC ALUMINAS, AND HIGH-TEMPERATURE STABILE AND HIGHLY POROUS ALUMINUM OXIDES IN A PURE PHASE WHICH ARE OBTAINED THEREFROM

(75) Inventors: Klaus Noweck, Brunsbüttel (DE); Jürgen Schimanski, Brunsbüttel (DE); Jens Juhl, Itzehoe (DE); Frank Michael Bohnen, Brunsbüttel (DE); Reiner Glöckler, Brunsbüttel (DE); Arnold Meyer, St. Michaelisdonn (DE)

(73) Assignee: SASOL Germany Gmb (DE)

( * ) Notice: Subject to any disclaimer, the term of this patent is extended or adjusted under 35 U.S.C. 154(b) by 0 days.

(21) Appl. No.: 09/529,484
(22) PCT Filed: Aug. 5, 1999
(86) PCT No.: PCT/DE99/02464
§ 371 (c)(1),
(2), (4) Date: Jun. 9, 2000
(87) PCT Pub. No.: WO00/09445
PCT Pub. Date: Feb. 24, 2000

(30) Foreign Application Priority Data
Aug. 14, 1998 (DE) .......................................... 198 36 821

(51) Int. Cl.$^7$ ................................................ C01F 7/00
(52) U.S. Cl. ........................................ 423/625; 423/628
(58) Field of Search .............................. 423/625, 626, 423/628, 127

(56) References Cited

U.S. PATENT DOCUMENTS

| | | | |
|---|---|---|---|
| 3,898,322 A | | 8/1975 | Leach |
| 4,179,408 A | * | 12/1979 | Sanchez et al. |
| 4,248,852 A | * | 2/1981 | Wakabayashi et al. ...... 423/625 |
| 4,797,139 A | * | 1/1989 | Bauer |
| 4,818,515 A | * | 4/1989 | Ceresa et al. |
| 5,055,019 A | | 10/1991 | Meyer et al. |
| 5,244,648 A | * | 9/1993 | Dupin et al. ................ 423/626 |
| 5,273,949 A | | 12/1993 | Chopin et al. |
| 5,397,758 A | * | 3/1995 | Bouruetaubertot et al. . 502/303 |
| 5,531,976 A | * | 7/1996 | Decker, Jr. et al. ......... 423/628 |
| 5,593,654 A | * | 1/1997 | Decker, Jr. et al. ......... 423/628 |
| 5,707,716 A | * | 1/1998 | Yoshino et al. |
| 5,759,213 A | * | 6/1998 | Adair et al. |
| 6,030,599 A | * | 2/2000 | Noweck et al. |

FOREIGN PATENT DOCUMENTS

| | | | |
|---|---|---|---|
| GB | 1226012 | * | 3/1971 |
| WO | WO 92/19536 | | 11/1992 |
| WO | 95/12547 | * | 5/1995 |

* cited by examiner

Primary Examiner—S J Bos
(74) Attorney, Agent, or Firm—Browning Bushman P.C.

(57) ABSTRACT

This invention relates to crystalline boehmitic aluminas the crystallites of which exhibit unusual dimensional differences in the space directions 020 and 120. This invention further relates to a method for preparing such aluminas and the follow-up products obtained therefrom by calcination.

10 Claims, No Drawings

BOEHMITIC ALUMINAS, AND HIGH-TEMPERATURE STABILE AND HIGHLY POROUS ALUMINUM OXIDES IN A PURE PHASE WHICH ARE OBTAINED THEREFROM

BACKGROUND OF THE INVENTION

1. Field of the Invention

This invention relates to crystalline boehmitic aluminas the crystallites of which exhibit unusual dimensional differences in the space directions 020 and 120. This invention further relates to a method for preparing such aluminas and the follow-up products obtained therefrom by calcination.

2. Description of the Prior Art

The structural relations of the various aluminium oxides and aluminium hydroxides are very complex. Main distinctions are made between $\alpha$-$Al_2O_3$ (corundum), $\alpha$-AlO(OH) (diaspore), $\alpha$-Al(OH)$_3$ (occasionally also termed $\beta$-Al(OH)$_3$, bayerite, or bauxite dihydrate), $\gamma$-$Al_2O_3$, $\gamma$-AlO(OH) (boehmite), and $\gamma$-Al(OH)$_3$ (occasionally also termed $\alpha$-Al(OH)$_3$, gibbsite, hydrargillite). In addition, there exist numerous modifications thereof, particularly modifications of different aluminium oxides obtained by thermal degradation of the aluminium hydroxides or aluminium oxide hydrates. For instance, it is generally believed that boehmitic alumina will undergo the following conversion under the influence of temperature:

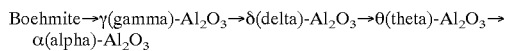

Boehmite→$\gamma$(gamma)-$Al_2O_3$→$\delta$(delta)-$Al_2O_3$→$\theta$(theta)-$Al_2O_3$→$\alpha$(alpha)-$Al_2O_3$ In literature references there are no standardized designations for the various aluminium oxides, aluminium oxide hydrates (occasionally also termed aluminium oxide hydroxides), and aluminium hydroxides, particularly with respect to the preceding Greek characters. The term 'boehmitic aluminas' as used herein comprises boehmitic and pseudo-boehmitic aluminas.

Boehmitic aluminas are known. High-purity boehmitic aluminas can be prepared for example by controlled hydrolysis of aluminium alkoxides. The resultant aluminium hydroxide hydrogels crystallize for example in the form of the rhombic aluminium oxide hydrate crystallite ($\gamma$-AlO(OH), boehmitic alumina).

DE 38 23 895-C1 discloses a process for producing boehmitic aluminas with pore radii which can be adjusted in a controlled way from 3 to 100 nm. According to said process, the boehmitic aluminas are subjected to hydrothermal aging at a steam pressure from 1 to 30 bar (corresponding to a temperature from 100 to 235° C.) for 0.5 to hours with agitation at a peripheral velocity from 1 to 6 s$^{-1}$. Such aluminas and the boehmitic aluminas produced by other processes have crys-tallite sizes (measured on the 020 reflex) which are always smaller by at least 2 nm compared to the crystallite sizes measured on the 120 reflex. In U.S. Pat. No. 3,898,322, too, a process for producing hydrothermally aged alumina suspension is described. According to said process, the aqueous aluminium hydroxide/aluminium oxide hydrate suspension obtained by hydrolysis of the aluminium alkoxides is subjected to hydrothermal aging at room temperature for 2 to 60 hours.

SUMMARY OF THE INVENTION

It is an object of the present invention to provide boehmitic aluminas having unusual morphologies. It is a further object of this invention to provide aluminium oxides with unusual high-temperature stabilities and, furthermore, with extraordinarily large surfaces and pore volumes after calcination.

The problem is solved by crystalline boehmitic alumina with a crystallite size measured in nm on the 020 reflex which is larger than the crystallite size which is smaller by 1.5 nm, preferably 0.5 nm, measured on the 120 reflex. It is particularly preferred that the crystallite size measured in nm on the 020 reflex be larger than the crystallite size measured in nm on the 120 reflex.

It is a further object of the present invention to provide methods for preparing the crystalline boehmitic aluminas of the instant invention.

DESCRIPTION OF THE PREFERRED EMBODIMENTS

The starting compounds employed for preparing the crystalline boehmitic aluminas of the present invention are conventional (i.e. crystalline, partially crystalline, or amorphous) aluminium-oxygen compounds, such as aluminium oxide hydrates, aluminium hydroxides, or mixtures thereof with aluminium oxides, preferably conventional pseudoboehmitic and/or boehmitic aluminas. When using commercial aluminium-oxygen compounds produced by other processes, or when the boehmitic alumina is not produced and is readily employed, for example as a hydrogel, it is preferred that the aluminium-oxygen compounds be subjected to grinding prior to aging according to this invention.

The starting compounds are aluminium oxide hydrates (or aluminium oxide hydroxides) which are preferably prepared by hydrolysis of aluminium alkoxides obtained from $C_1$ to $C_{24+}$ alcohols or mixtures thereof. The aluminium alkoxides can be prepared for example by the Ziegler process.

The aluminium alkoxides are hydrolyzed in an aqueous environment. Generally, the hydrolysis can be performed in a temperature range from 30 to 150° C., preferably 60 to 100° C. The resultant aluminium oxide hydrate suspension is then separated from the aqueous alcohol phase. The alumina-water phase may contain for example alumina hydrate with an $Al_2O_3$ content from 5 to 12 wt. %, preferably 10 to 11 wt. %.

The aluminium-oxygen compounds employed as starting materials may also originate from natural resources or can be produced by other processes, e.g. the amalgam process.

The crystalline boehmitic aluminas of the present invention can be prepared by long-time hydrothermal aging of oxygen compounds of the aluminium, particularly aluminium oxide hydrates, in the presence of water at temperatures from 60 to 240° C., preferably 70 to 160° C., most preferably 70 to 110° C. for at least 10 hours, preferably at least 20 hours, most preferably at least 24 to 70 hours or 30 to 60 hours. It is desirable to keep the shear stress on the aluminium oxide hydrate suspension low during the production. The term 'low shear stress' used herein means the shear stress caused by an agitator, e.g. a propeller agitator, running at a peripheral velocity of 0.5 to 3 m/s. The particle size of the aluminium oxide hydrates in the suspension is preferably in the range from 1 to 12 microns, most preferably from 6 to 12 microns.

According to another embodiment of the present invention, the crystalline boehmitic aluminas of this invention can be prepared by hydrothermal aging in the presence of water and at least bidentate, preferably at least tridentate bases, which are preferably nitrogen bases, and at temperatures from 30 to 240° C., preferably 70 to 160° C., for 0.5 to 170 hours. Examples thereof are diethylene triamine, dipropylene triamine, triethylene tetramine (triene), tetraethylene pentamine (tetrene), and pentaethylene hexamine (pentrene).

According to yet another embodiment of the present invention, the crystalline boehmitic aluminas of this invention can be prepared by long-time hydrothermal aging in the presence of water and metallic or nonmetallic oxides, or oxide hydrates, except for aluminium oxide or aluminium oxide hydrates, and water at 40 to 240° C., preferably 70 to 160° C., for at least 8 hours, preferably 16 to 170 hours, most preferably 32 to 170 hours.

Preferably, said metallic or nonmetallic oxides or oxide hydrates are those of silicon, zirconium, titanium, lanthane, and/or boron. Examples thereof are $SiO_2$, $ZrO_2$, $TiO_2$, and $B_2O_3$. Such oxides are added in quantities from 0.1 to 5 wt. %, preferably 0.2 to 2 wt. %, referring to $Al_2O_3$.

It is preferred that the crystalline boehmitic aluminas of the present invention or the aluminium oxides prepared therefrom be free from any foreign atoms, particularly other metal atoms (including silicon and phosphorus), i.e. said materials should exclusively consist of aluminium, oxygen, and/or hydrogen in quantities of greater than 99 atom %, preferably greater than 99.9 atom %.

Preferably, the crystalline boehmitic aluminas of the present invention, independently of one another, have the following characteristics: pore volumes of greater than 0.8 $cm^3/g$, preferably greater than 0.9 $cm^3/g$, crystallite sizes (measured on the 020 reflex) of greater than 10 nm, preferably greater than 12 nm, and surfaces of greater than 150 $m^2$, preferably 150 to 200 $m^2$. In contrast thereto, it is preferred that the crystalline boehmitic aluminas of the present invention prepared according to the third embodiment, independently of one another, have the following characteristics: pore volumes of greater than 0.7 $cm^3/g$, preferably greater than 0.9 $cm^3/g$, crystallite sizes (measured on the 020 reflex) from about 6 to 10 nm, and surfaces of greater than 200 $m^2$.

The aluminium oxides prepared from the crystalline aluminas of the present invention by thermal treatment at higher than 150° C., preferably by calcination at temperatures from 800 to 1,500° C. for at least 0.5 hour are a further object of the present invention. Said aluminium oxides are distinguished by their particularly large surfaces, large pore volumes, and excellent high-temperature stabilities. The term 'thermal stability' employed herein means stability to changes in the surface or crystalline phase brought about by external influences, such as water, chemicals, pressure, or mechanical stress and temperature.

Furthermore, the aluminium oxide hydrates and aluminium oxides according to the present invention are pure-phase and stable-phase products which are present as delta, theta, or alpha modifications, depending on the calcination time and temperature. More details are presented in the tables 1, 2, and 3 showing the powder diffraction pattern data of the different aluminium oxides of this invention.

The term 'pure-phase' employed herein means that more than 90 wt. %, preferably more than 98 wt. % of the crystalline aluminium oxide consists of a single phase (determined by X-ray powder diffraction). The theta-aluminium oxides of the present invention are pure-phase products on the condition that particularly the d-values (as Å) do not present any peaks in the X-ray powder diffraction pattern which are characteristic of $\alpha$-$Al_2O_3$.

With respect to the X-ray powder diffraction patterns of conventional aluminium oxides, reference is made to the corresponding. JCPDS sheets (US National Bureau of Standards) for corundum ($\alpha$-$Al_2O_3$), delta- and theta-aluminium oxide.

The term 'stable-phase' employed herein means that the crystalline phase will not change even if the product is exposed for a long time to the same or lower temperature used in the production of said aluminium oxide by calcination.

Furthermore, the aluminium oxides of the present invention are temperature-stable and, contrary to conventional aluminium oxides, have surfaces of larger than 60 $m^2$/, preferably larger than 70 $m^2/g$, even after calcination at 1,200° C. for 3 hours. The calcination is performed in heated air in a muffle furnace.

The aluminium oxides of the present invention have pore volumes of greater than 0.6 $cm^3/g$, preferably from 0.7 to 1 $cm^3/g$ (determined by the mercury penetration method in accordance with DIN 66 133) within a pore radius range from 1.8 to 100 nm. The aluminium oxides of this invention keep said characteristic even after exposure to temperatures of 1,100° C. for 24 hours. Conventional aluminium oxides, e.g. those obtained by calcination of bayerite, present distinctly smaller pore volumes (about 0.2 to 0.4 $cm^3/g$).

The aluminium,oxides of this invention are most useful as catalysts or catalyst supports, particularly as support material for automobile exhaust gas catalysts. In this case the catalyst support is treated with noble metal catalysts, such as platinum or palladium.

When using the aluminium oxides of this invention, the catalyst or catalyst support can be applied in thin layers which remain stable even at high temperatures, e.g. of greater than 1,000° C. This characteristic is most advantageous in exhaust gas catalyst applications. Furthermore, stabilization aids, such as lanthane oxideor $SiO_2$, employed in technical applications can mostly be dispensed with. Stabilization aids made of metal oxides may have adverse effects on the catalytic behavior of the $Al_2O_3$ catalyst or catalyst support.

The crystallite sizes of the boehmitic aluminas according to this invention were determined on the 120 and 020 reflexes using the general Scherrer formula:

Crystallite size=($K$×lambda×57.3)/(beta×cos theta)

K (form factor): 0.992

Lambda (X-ray wave length): 0.154 nm

Beta (corrected line broadening of apparatus): reflex-dependent

Theta: reflex-dependent

The measurements were carried out using a Philips XRD X'pert apparatus. The measurement parameters for the samples obtained in Example 1 (Comparative Example) and Example 2 have been compiled in Tables 1 and 2, respectively.

The reflexes 120 and 020 (Miller indices) were determined on the boehmite and relate to the unconventional crystallographic Amam mounting of orthorhombic space group no. 63. The conventional mounting is Cmcn, wherein the a- and c-axes have been exchanged in comparison with the unconventional Amam mounting.

The surface areas of the aluminium oxides of this invention were determined by the $N_2$ sorption method (BET method in accordance with DIN 66131). The pore volumes and pore volume distributions were determined by the mercury intrusion (penetration) method in accordance with DIN 66133 using a mercury porosimeter. The pore volumes

EXAMPLE 1

Comparative Example

First, an alumina slurry to be employed as the starting material was prepared by neutral aluminium alcoholate hydrolysis:

An aluminium alcoholate mixture obtained as an intermediate in the Ziegler/Alfol process was hydrolyzed with water which had been liberated from foreign ions in a demineralization unit. The hydrolysis was performed at 90° C. in an agitated kettle. The resultant two phases, i.e. the upper alcohol phase and the lower alumina/water phase, were immiscible.

500 grams of this alumina slurry (pH 9) containing 10 to 11 wt. % $Al_2O_3$ were added in portions to a reactor operated at a pressure of 3 bar corresponding to 115° C. After the reaction conditions had been adjusted, the slurry was allowed to age for 4 hours using a standard agitator running at a peripheral velocity of 1.6 m/s corresponding to an agitator speed of 500 r.p.m.

The following values were obtained:

| Reflex | Beta | Theta | Crystallite Size |
|--------|-------|-------|------------------|
| 120    | 0.919 | 14°   | 9.8 nm           |
| 020    | 0.919 | 7°    | 6.7 nm           |

The 120 reflex is greater by 3.1 nm than the 020 reflex.

The specific surface was determined by the $N_2$ sorption method (BET method). After thermal treatment at 1,200° C. for 3 hours the specific surface was found to be 46 $m^2/g$. The X-ray powder diffraction pattern of said sample is shown in Table 1. It presents significant alpha-phase signals.

EXAMPLE 2

500 grams of the alumina slurry (pH 9) containing 10 to 11 wt. % $Al_2O_3$ as defined in the Comparative Example were added in portions to a reactor operated at normal pressure and 98° C. After the reaction conditions had been adjusted, the slurry was allowed to age for 16 hours using a standard agitator running at a peripheral velocity of 1.6 m/s corresponding to an agitator speed of 500 r.p.m. The crystallite sizes measured as described in the Comparative Example were 13.5 nm (120 reflex) and 12.1 nm (020 reflex).

After thermal treatment at 1,200° C. for 3 hours the specific surface was found to be 68 $m^2/g$. The X-ray powder diffraction pattern of this sample is shown in Table 1. It presents theta-phase signals. The aluminium oxide is present in the theta phase with a phase purity of greater than 98%.

After aging for 20 hours under the conditions specified hereinabove the crystallite sizes were found to be 13.5 nm (120 reflex) and 13.0 nm (020 reflex).

EXAMPLE 3

500 grams of the alumina slurry (pH 9) containing 10 to 11 wt. % $Al_2O_3$ as defined in the Comparative Example were added in portions to a reactor operated at a pressure of 3 bar corresponding to 110° C. After the reaction conditions had been adjusted, the slurry was allowed to age for 40 hours using a standard agitator running at a peripheral velocity of 1.6 m/s corresponding to an agitator speed of 500 r.p.m.

The crystallite sizes measured as described in the Comparative Example were 15.3 nm (120 reflex) and 15.3 nm (020 reflex). After thermal treatment at 1,200° C. for 3 hours the specific surface was found to be 67 $m_2/g$.

EXAMPLE 4

500 grams of the alumina slurry (pH 9) containing 10 to 11 wt. % $Al_2O_3$ as defined in the Comparative Example were added in portions to a reactor operated at a pressure of 3 bar corresponding to 110° C. After the reaction conditions had been adjusted, the slurry was allowed to age for 60 hours using a standard agitator running at a peripheral velocity of 1.6 m/s corresponding to an agitator speed of 500 r.p.m.

The crystallite sizes measured as described in the Comparative Example were 16.1 nm (120 reflex) and 16.5 nm (020 reflex). After thermal treatment at 1,200° C. for 3 hours the specific surface was found to be 72 $m^2/g$.

EXAMPLE 5

600 grams of the alumina slurry (pH 9) containing 10 to 11 wt. % $Al_2O_3$ as defined in the Comparative Example were added to 50 grams of a 20% aqueous tetrene solution and boiled under reflux for 68 hours. 300 grams of $H_2O$ were added to this mixture at one-hour intervals. The mixture was diluted with 200 grams of $H_2O$ und spray dried.

The crystallite sizes measured as described in the Comparative Example were 14.4 nm (120 reflex) and 14.6 nm (020 reflex). After thermal treatment at 1,200° C. for 3 hours the specific surface was found to be 81 $m^2/g$.

EXAMPLE 6

300 grams of a 6.02% aluminium-tri-n-hexanolate solution in n-hexanol were added at 90° C. to 360 grams of a 5% aqueous tetrene solution. This mixture was agitated at 90° C. for 30 minutes. The hexanol was removed from the reaction mixture by azeotropic distillation. The residue then was agitated at 90° C. for 24 hours. $H_2O$ was added in 100-gram portions after 1 hour, 2 hours, and 3 hours, respectively. The reaction mixture was spray dried.

The crystallite sizes measured as described in the Comparative Example were 11.0 nm (120 reflex) and 11.8 nm (020 reflex). After thermal treatment at 1,200° C. for 3 hours the specific surface was found to be 76 $m^2/g$.

EXAMPLE 7

300 grams of a 6.02% aluminium-tri-n-hexanolate solution in n-hexanol were added at 90° C. to 360 grams of a 5% aqueous tetrene solution. This mixture was agitated at 90° C. for 30 minutes. The hexanol was removed from the reaction mixture by azeotropic distillation. The residue then was agitated at 90° C. for 68 hours. $H_2O$ was added in 100-gram portions after 1 hour, 2 hours, and 3 hours, respectively. The reaction mixture was spray dried.

The crystallite sizes measured as described in the Comparative Example were 12.6 nm (120 reflex) and 16.4 nm (020 reflex). After thermal treatment at 1,200° C. for 3 hours the specific surface was found to be 79 $m^2/g$.

TABLE 1

X-Ray Powder Diffraction Pattern of Example 1 (Comparative Example) with Significant Quantity of Alpha-Al₂O₃

| d-Value [°2θ] | d-Value α¹ [Å] | d-Value α² [Å] | T-Width [°2θ] | Height [counts] | Backgr. [counts] | Rel. Int. [%] | Signific. |
|---|---|---|---|---|---|---|---|
| 16.205 | 5.46527 | 5.47872 | 0.480 | 19 | 29 | 4.1 | 1.56 |
| 19.550 | 4.53706 | 4.54822 | 0.480 | 45 | 27 | 9.5 | 2.53 |
| 21.850 | 4.06440 | 4.07439 | 0.480 | 9 | 24 | 1.9 | 0.80 |
| 25.560 | 3.48224 | 3.49081 | 0.180 | 276 | 30 | 58.5 | 7.44 |
| 31.230 | 2.86174 | 2.86878 | 0.200 | 286 | 41 | 60.7 | 2.47 |
| 32.695 | 2.73678 | 2.74351 | 0.120 | 441 | 37 | 93.7 | 1.23 |
| 32.825 | 2.72624 | 2.73294 | 0.080 | 441 | 37 | 93.7 | 0.97 |
| 35.135 | 2.55211 | 2.55838 | 0.140 | 449 | 35 | 95.4 | 4.34 |
| 36.660 | 2.44937 | 2.45539 | 0.200 | 313 | 34 | 66.5 | 1.41 |
| 37.695 | 2.38446 | 2.39032 | 0.140 | 185 | 31 | 39.3 | 2.48 |
| 38.910 | 2.31275 | 2.31844 | 0.120 | 266 | 30 | 56.4 | 0.91 |
| 39.855 | 2.26007 | 2.26563 | 0.160 | 169 | 30 | 35.9 | 0.92 |
| 41.715 | 2.16349 | 2.16881 | 0.480 | 21 | 27 | 4.5 | 1.69 |
| 43.305 | 2.08767 | 2.09280 | 0.160 | 396 | 27 | 84.1 | 6.77 |
| 44.785 | 2.02205 | 2.02703 | 0.320 | 282 | 26 | 59.9 | 9.47 |
| 45.605 | 1.98758 | 1.99247 | 0.360 | 137 | 25 | 29.1 | 3.48 |
| 46.515 | 1.95080 | 1.95560 | 0.240 | 90 | 24 | 19.2 | 2.18 |
| 47.630 | 1.90770 | 1.91239 | 0.120 | 185 | 23 | 39.3 | 1.31 |
| 50.680 | 1.79981 | 1.80424 | 0.320 | 77 | 22 | 16.4 | 4.82 |
| 51.520 | 1.77242 | 1.77678 | 0.320 | 22 | 22 | 4.7 | 0.78 |
| 52.450 | 1.74317 | 1.74745 | 0.100 | 154 | 22 | 32.7 | 1.18 |
| 57.415 | 1.60366 | 1.60761 | 0.160 | 317 | 25 | 67.3 | 6.46 |
| 58.730 | 1.57085 | 1.57471 | 0.240 | 26 | 25 | 5.5 | 0.76 |
| 59.820 | 1.54480 | 1.54861 | 0.120 | 114 | 25 | 24.3 | 1.93 |
| 61.240 | 1.51234 | 1.51606 | 0.160 | 74 | 25 | 15.7 | 1.05 |
| 62.295 | 1.48924 | 1.49291 | 0.400 | 71 | 24 | 15.0 | 2.02 |
| 63.850 | 1.45667 | 1.46025 | 0.240 | 137 | 24 | 29.1 | 3.28 |
| 64.165 | 1.45028 | 1.45385 | 0.120 | 98 | 24 | 20.8 | 1.06 |
| 65.450 | 1.42488 | 1.42838 | 0.320 | 59 | 23 | 12.6 | 1.06 |
| 66.475 | 1.40537 | 1.40883 | 0.100 | 324 | 24 | 68.8 | 0.85 |
| 67.395 | 1.38841 | 1.39182 | 0.440 | 471 | 23 | 100.0 | 18.43 |
| 68.155 | 1.37477 | 1.37815 | 0.100 | 190 | 23 | 40.4 | 0.92 |
| 72.900 | 1.29654 | 1.29973 | 0.320 | 41 | 21 | 8.7 | 1.33 |
| 73.700 | 1.28443 | 1.28759 | 0.400 | 48 | 21 | 10.1 | 2.55 |
| 75.460 | 1.25878 | 1.26188 | 0.560 | 28 | 19 | 6.0 | 4.30 |
| 76.800 | 1.24012 | 1.24317 | 0.160 | 58 | 18 | 12.3 | 1.06 |

Measurement parameters:
Start angle [°2θ]: 5,010; end angle [°2θ]: 79.990; start d-value [Å]: 17.62435; end d-value [Å]: 1.19850; anode material: Cu; α¹ wave length [Å]: 1.54060; α² wave length [Å]: 1.54439

TABLE 2

X-Ray Powder Diffraction Pattern of Example 2 (Al₂O₃ with > 98% Theta Phase)

| d-Value [°2θ] | d-Value α¹ [Å] | d-Value α² [Å] | T-Width [°2θ] | Height [counts] | Backgr. [counts] | Rel. Int. [%] | Signific. |
|---|---|---|---|---|---|---|---|
| 16.240 | 5.45357 | 5.46699 | 0.400 | 40 | 28 | 6.6 | 1.55 |
| 19.495 | 4.54974 | 4.56093 | 0.400 | 56 | 30 | 9.4 | 1.21 |
| 25.230 | 3.52704 | 3.53571 | 0.800 | 11 | 28 | 1.8 | 1.26 |
| 31.130 | 2.87070 | 2.87777 | 0.320 | 292 | 42 | 48.7 | 4.94 |
| 32.685 | 2.73759 | 2.74433 | 0.180 | 600 | 42 | 100.0 | 3.57 |
| 32.790 | 2.72907 | 2.73578 | 0.060 | 562 | 42 | 93.6 | 0.80 |
| 34.845 | 2.57268 | 2.57901 | 0.320 | 102 | 41 | 17.0 | 2.05 |
| 36.635 | 2.45098 | 2.45701 | 0.320 | 372 | 40 | 62.1 | 5.21 |
| 38.820 | 2.31791 | 2.32361 | 0.280 | 266 | 41 | 44.3 | 4.26 |
| 39.890 | 2.25816 | 2.26372 | 0.240 | 196 | 40 | 32.7 | 1.80 |
| 43.295 | 2.08813 | 2.09326 | 0.320 | 15 | 29 | 2.5 | 1.01 |
| 44.720 | 2.02484 | 2.02982 | 0.360 | 361 | 28 | 60.1 | 12.86 |
| 46.530 | 1.95020 | 1.95500 | 0.480 | 59 | 27 | 9.9 | 0.93 |
| 47.585 | 1.90940 | 1.91410 | 0.280 | 196 | 25 | 32.7 | 5.21 |
| 50.585 | 1.80297 | 1.80741 | 0.240 | 85 | 24 | 14.1 | 2.69 |
| 51.470 | 1.77403 | 1.77839 | 0.320 | 31 | 23 | 5.2 | 1.18 |
| 52.455 | 1.74301 | 1.74730 | 0.320 | 22 | 23 | 3.7 | 1.03 |
| 56.580 | 1.62533 | 1.62933 | 0.640 | 18 | 23 | 2.9 | 0.99 |
| 57.365 | 1.60494 | 1.60889 | 0.320 | 20 | 24 | 3.4 | 0.75 |
| 58.755 | 1.57024 | 1.57410 | 0.240 | 37 | 24 | 6.2 | 2.28 |
| 59.850 | 1.54410 | 1.54790 | 0.200 | 139 | 24 | 23.2 | 1.67 |

TABLE 2-continued

X-Ray Powder Diffraction Pattern of Example 2
($Al_2O_3$ with > 98% Theta Phase)

| d-Value [°2θ] | d-Value $α^1$ [Å] | d-Value $α^2$ [Å] | T-Width [°2θ] | Height [counts] | Backgr. [counts] | Rel. Int. [%] | Signific. |
|---|---|---|---|---|---|---|---|
| 62.310 | 1.48892 | 1.49258 | 0.400 | 100 | 24 | 16.7 | 2.83 |
| 63.925 | 1.45514 | 1.45872 | 0.400 | 164 | 25 | 27.3 | 10.08 |
| 65.355 | 1.42672 | 1.43023 | 0.480 | 69 | 26 | 11.5 | 2.58 |
| 66.450 | 1.40584 | 1.40930 | 0.240 | 228 | 25 | 38.0 | 2.47 |
| 67.395 | 1.38841 | 1.39182 | 0.600 | 524 | 26 | 87.4 | 39.85 |
| 72.845 | 1.29738 | 1.30057 | 0.480 | 50 | 24 | 8.4 | 2.92 |
| 73.715 | 1.28420 | 1.28736 | 0.400 | 64 | 23 | 10.7 | 3.36 |
| 75.295 | 1.26113 | 1.26423 | 0.400 | 27 | 20 | 4.5 | 1.56 |
| 77.320 | 1.23308 | 1.23611 | 0.960 | 15 | 18 | 2.5 | 3.48 |

Measurement parameters as specified in Table 1.

TABLE 3

X-Ray Powder Diffraction Pattern of an Aluminium Oxide of this Invention in the Delta Phase

| d-Value [°2θ] | d-Value $α^1$ [Å] | d-Value $α^2$ [Å] | T-Width [°2θ] | Height [counts] | Backgr. [counts] | Rel. Int. [%] | Signific. |
|---|---|---|---|---|---|---|---|
| 19.605 | 4.52446 | 4.53559 | 0.480 | 21 | 49 | 6.2 | 0.82 |
| 32.855 | 2.72382 | 2.73052 | 0.560 | 69 | 139 | 20.3 | 2.95 |
| 36.865 | 2.43621 | 2.44221 | 0.320 | 114 | 132 | 33.8 | 0.95 |
| 39.570 | 2.27568 | 2.28128 | 0.880 | 117 | 90 | 34.5 | 10.25 |
| 45.475 | 1.99296 | 1.99787 | 0.560 | 272 | 58 | 80.4 | 7.14 |
| 46.385 | 1.95596 | 1.96077 | 0.480 | 146 | 56 | 43.2 | 2.24 |
| 50.865 | 1.79370 | 1.79811 | 0.800 | 10 | 40 | 3.0 | 1.35 |
| 58.990 | 1.56455 | 1.56839 | 0.140 | 11 | 61 | 3.2 | 0.85 |
| 59.985 | 1.54095 | 1.54474 | 0.800 | 18 | 14 | 5.5 | 1.38 |
| 66.470 | 1.40547 | 1.40892 | 0.560 | 279 | 83 | 82.4 | 3.34 |
| 67.220 | 1.39160 | 1.39502 | 0.240 | 339 | 76 | 100.0 | 0.99 |

Measurement parameters as specified in Table 1.

What is claimed is:

1. A method of preparing crystalline boehmitic alumina characterized in that aluminum-oxygen compounds are hydrothermally aged in the presence of water and at least one bidentate base at 30 to 240° C. for 0.5 to 170 hours.

2. A method of preparing crystalline boehmitic alumina characterized in that aluminum-oxygen compounds are, hydrothermally aged in the presence of water and oxides or oxide hydrates of zirconium, titanium, lanthanum and/or boron at 40 to 240° C. for at least 8 hours.

3. The method of any of claims 1 or 2 characterized in that the boehmitic alumina is subjected to thermal treatment by calcination to obtain an aluminum oxide having a surface area of greater than 60 m²/g.

4. The method of any of claims 1 or 2 wherein the boehmitic alumina is subjected to thermal treatment by calcination and the resulting aluminum oxide has pore volumes of greater than 0.6 cm³/g determined by the mercury penetration method in the pore radium range of from 1.8 to 100 nm.

5. The method of any of claims 1 or 2 wherein the boehmitic alumina is subjected to thermal treatment comprising calcination at a temperature of from 800 to 1500° C. for at least 0.5 hour.

6. The method of claim 1 further comprising the step of thermal treatment of the crystalline boehmitic alumina to produce a pure theta aluminum oxide.

7. The method of claim 2 further comprising the step of thermal treatment of the boehmitic alumina to produce pure theta aluminum oxide.

8. The method of any of claims 1 or 2, wherein the aluminum-oxygen compounds used as starting materials are obtained by hydrolysis of at least one aluminum alkoxide compound.

9. The method of claim 1 or claim 2, wherein the crystalline boehmitic alumina has a crystallite size that determined on the 020 reflex in nm is larger than the measured crystallite size determined on the 120 reflex reduced by 1.5 nm.

10. The method of claim 1 or claim 2, wherein the crystalline boehmitic alumina has a crystallite size that determined on the 020 reflex in nm is larger than the measured crystallite size determined on the 120 reflex reduced by 0.5 nm.

* * * * *

UNITED STATES PATENT AND TRADEMARK OFFICE
CERTIFICATE OF CORRECTION

PATENT NO. : 6,773,690 B1
DATED : August 10, 2004
INVENTOR(S) : Klaus Noweck et al.

It is certified that error appears in the above-identified patent and that said Letters Patent is hereby corrected as shown below:

Title page,
Item [73], Assignee, should read as follows:
-- Sasol Germany GmbH --

Signed and Sealed this

Twenty-third Day of November, 2004

JON W. DUDAS
*Director of the United States Patent and Trademark Office*